United States Patent [19]
Denton et al.

[11] Patent Number: 6,042,958
[45] Date of Patent: Mar. 28, 2000

[54] COMPOSITE MEMBRANES

[75] Inventors: Jan Denton, Reading; John Malcolm Gascoyne, Bucks; Graham Alan Hards; Thomas Robertson Ralph, both of Readiing, all of United Kingdom

[73] Assignee: Johnson Matthey Public Limited Company, United Kingdom

[21] Appl. No.: 09/063,998

[22] Filed: Apr. 21, 1998

[30] Foreign Application Priority Data

Apr. 25, 1997 [GB] United Kingdom .................. 9708365

[51] Int. Cl.[7] ...................................... H01M 8/10
[52] U.S. Cl. ............................ 429/30; 429/33; 204/282; 204/283; 204/296; 521/27
[58] Field of Search ..................... 204/296, 282, 204/283; 521/27; 429/30, 33, 40, 41, 42, 44

[56] References Cited

U.S. PATENT DOCUMENTS

| | | | |
|---|---|---|---|
| 3,282,875 | 11/1966 | Connolly et al. | 260/29.6 |
| 4,329,435 | 5/1982 | Kimoto et al. | 521/38 |
| 4,330,654 | 5/1982 | Ezzell et al. | 526/243 |
| 4,358,545 | 11/1982 | Ezzell et al. | 521/27 |
| 4,417,969 | 11/1983 | Ezzell et al. | 204/252 |
| 4,433,082 | 2/1984 | Grot | 524/755 |
| 4,505,797 | 3/1985 | Hodgdon et al. | 204/252 |
| 4,610,762 | 9/1986 | Birdwell | 204/1 |
| 4,664,761 | 5/1987 | Zupancic et al. | 204/129 |
| 4,740,525 | 4/1988 | Maerkl et al. | 518/701 |
| 5,094,995 | 3/1992 | Butt et al. | 502/402 |
| 5,438,082 | 8/1995 | Helmer-Metzmann et al. | 522/149 |
| 5,460,705 | 10/1995 | Murphy | 204/252 |
| 5,468,574 | 11/1995 | Ehrenberg et al. | 429/33 |
| 5,547,551 | 8/1996 | Bahar et al. | 204/296 |
| 5,595,676 | 1/1997 | Barnes et al. | 252/62.2 |
| 5,599,614 | 2/1997 | Bahar et al. | 204/296 |
| 5,599,639 | 2/1997 | Sansone et al. | 429/33 |
| 5,865,968 | 2/1999 | Denton et al. | 429/41 |

FOREIGN PATENT DOCUMENTS

| | | |
|---|---|---|
| 0331321 | 9/1989 | European Pat. Off. . |
| 0345964 | 12/1989 | European Pat. Off. . |
| 0574791 | 12/1993 | European Pat. Off. . |
| 0731520 | 9/1996 | European Pat. Off. . |
| 0791974 | 8/1997 | European Pat. Off. . |
| 1 619 026 | 8/1969 | Germany . |
| 1049549 | 11/1966 | United Kingdom . |
| WO 94/16002 | 7/1994 | WIPO . |
| WO 95/08581 | 3/1995 | WIPO . |
| WO 95/16730 | 6/1995 | WIPO . |
| WO 96/28242 | 9/1996 | WIPO . |
| WO 97/25369 | 7/1997 | WIPO . |

OTHER PUBLICATIONS

Kolde et al., Electrochemical Society Proceedings, vol. 95–23, pp. 193–201 (1995).
European Patent Office Search Report, dated Feb. 19, 1999 for corresponding EPO application No. 98302933.1.

*Primary Examiner*—Bruce F. Bell
*Attorney, Agent, or Firm*—Ratner & Prestia

[57] ABSTRACT

A novel composite membrane comprising a porous substrate of randomly orientated individual fibres and at least one ion conducting polymer, characterised in that the ion conducting polymer is embedded within the porous substrate, a process for its preparation and its use, particularly in fuel cells is disclosed.

28 Claims, 10 Drawing Sheets

FIGURE 1

Micrograph of a glass tissue - Density 0.2g fibres/cm$^3$ (Magnification 50X)

FIGURE 2

Micrograph of Fibre Substrate For Composite Membrane 2

Figure 3  Single cell performance of a MEA with composite membrane 2

Figure 4  Single cell performance of a MEA with composite membrane 3

FIGURE 5

Micrograph of Nafion-impregnated Composite Membrane 4

Figure 6  Single cell performance of a MEA with composite membrane 4

Figure 7  Single cell performance of a MEA with composite membrane 5

Figure 8 Stability of the MEA with composite membrane 5

Figure 9 Specific membrane resistance versus current density

Figure 10  Hydrogen gas cross-over versus membrane thickness

COMPOSITE MEMBRANES

The present invention relates to a novel composite membrane which is of use in electrochemical devices, particularly fuel cells, and a process for the manufacture of the novel composite membrane.

BACKGROUND OF THE INVENTION

Electrochemical cells invariably comprise at their fundamental level a solid or liquid ion conducting electrolyte and two electrodes, the anode and cathode, at which the desired electrochemical reactions take place. Electrochemical cells may be found in a range of devices, for example fuel cells, batteries, sensors, electrodialysis reactors and electrolytic reactors for a diverse range of applications including the electrolysis of water, chemical synthesis, salt splitting, water purification, effluent treatment, and metal finishing among others.

A fuel cell is an energy conversion device that efficiently converts the stored chemical energy of its fuel into electrical energy by combining either hydrogen, stored as a gas, or methanol stored as a liquid or gas, with oxygen to generate electrical power. The hydrogen or methanol are oxidised at the anode and oxygen is reduced at the cathode. Both electrodes are of the gas diffusion type. The electrolyte has to be in contact with both electrodes and may be acidic or alkaline, liquid or solid, in nature. In proton exchange membrane fuel cells (PEMFC), the electrolyte is a solid ion conducting, or more specifically a proton conducting, polymer membrane, commonly based on copolymers of perfluorosulphonic acid and tetrafluoroethylene, and the combined structure formed from the membrane and the two gas diffusion electrodes is known as the membrane electrode assembly (MEA).

Conventionally, solid ion conducting membrane electrolytes useful in fuel cells and other devices are selected from commercially available membranes, for example perfluorinated membranes sold under the trade names Nafion® (E.I. DuPont de Nemours and Co.), Aciplex® (Asahi Chemical Industry) and Flemion® (Asahi Glass KK). For application in the PEMFC they are typically below 200 µm in thickness to ensure a high level of ionic conductivity. One of the problems experienced with these conventional proton conducting membranes used for PEM fuel cell construction, is the dimensional changes that occur as the level of water content (hydration) of the membrane changes. This is a particular problem during fabrication of the MEA as the stresses produced by changes in hydration during the conventionally employed thermal bonding process, can be large enough to break the bond between the catalyst and the membrane, or the catalyst and the substrate. Furthermore, the dimensional changes that occur due to the changes in the level of hydration of the membrane lead to considerable difficulties in handling membranes during the fabrication of MEAs, particularly large area MEAs in excess of, for example, 500 cm². The thinner the membrane, the more difficult the handling becomes. With thicker types of membrane (eg>350 µm) developed for other applications, it has been possible to incorporate 'macro' reinforcing materials such as woven polytetrafluoroethylene (PTFE) to minimise such dimensional changes. However, these thicker materials have too low an ionic conductivity to be of use in the PEMFC. U.S. Pat. No. 5,547,551 assigned to W. L. Gore & Associates Inc., describes the fabrication of ultra-thin composite membranes, below 25 µm in thickness, comprising proton exchange polymer material incorporated into an expanded porous PTFE membrane. According to Kolde et al., Electrochemical Society Proceedings Vol. 95-23, p193–201 (1995), the composite membrane has considerably improved dimensional stability compared to the conventional non-reinforced membranes. The material has, however, a higher specific resistance (lower ionic conductivity) than an unmodified pure proton conducting membrane such as Nafion®117 by a factor of at least two.

The higher specific resistance of the above composite membrane means that in practice it has to be much thinner than the equivalent pure proton conducting membrane to maintain the same overall conductivity and thus cell performance. However, reducing the thickness of the composite membrane reduces the advantages that a composite membrane can provide. For example, there is a limit to the extent to which the thickness of the membrane can be reduced since as the membrane is made thinner, the durability and longevity can decrease, and reactant gas cross-over through the membrane is more liable to occur, both of which lead to a reduction in the cell performance. Furthermore, the problems associated with dimensional stability and handlability for MEA fabrication can be exacerbated with thinner membranes.

E.I. DuPont de Nemours and Co. (WO95/16730) describe a process for making a reinforced substantially non-porous membrane with satisfactory mechanical strength and very low resistance to ionic conduction which approaches that of very thin, unreinforced perfluoro ion exchange polymer membranes. The composite membrane utilises a porous hydrocarbon substrate, such as a polyolefin, and on which at least one side is coated with an ion exchange film formed from a fluorinated polymer.

It is therefore an object of the present invention to overcome the disadvantages of conventional pure and composite membranes, by providing a novel composite ion exchange membrane with improved dimensional stability and handlability, and in which the ionic conductivity and reactant gas cross-over have not been compromised compared to a conventional unreinforced ion exchange membrane of the same polymer and comparable thickness. A further object of the present invention is to provide a process for the manufacture of the composite membrane of the invention, in particular a process that is capable of producing composite membranes in high volumes and with high yields and at low unit cost, and preferably as a single continuous process. A still further object is to provide a process for preparing an MEA in high volumes and with high yields and at low unit cost.

Accordingly, the present invention provides a composite membrane comprising a porous substrate of randomly orientated individual fibres and at least one ion conducting polymer, characterised in that the ion conducting polymer is embedded within the porous substrate. Alternatively, there is provided a composite membrane comprising a plurality of fibres randomly combined to form a porous substrate and at least one polymeric material, characterised in that the polymeric material is embedded within the porous substrate.

The porous substrate typically has at least 50%, suitably at least 75% of the individual pore sizes being greater than 1 µm in at least one direction, although a porous substrate wherein some of the pores are less than 1 µm in all directions is within the scope of the invention. Suitably, for applications in fuel cells, the total thickness of the membrane is less than 200 µm and preferably less than 100 µm.

Figure 1:
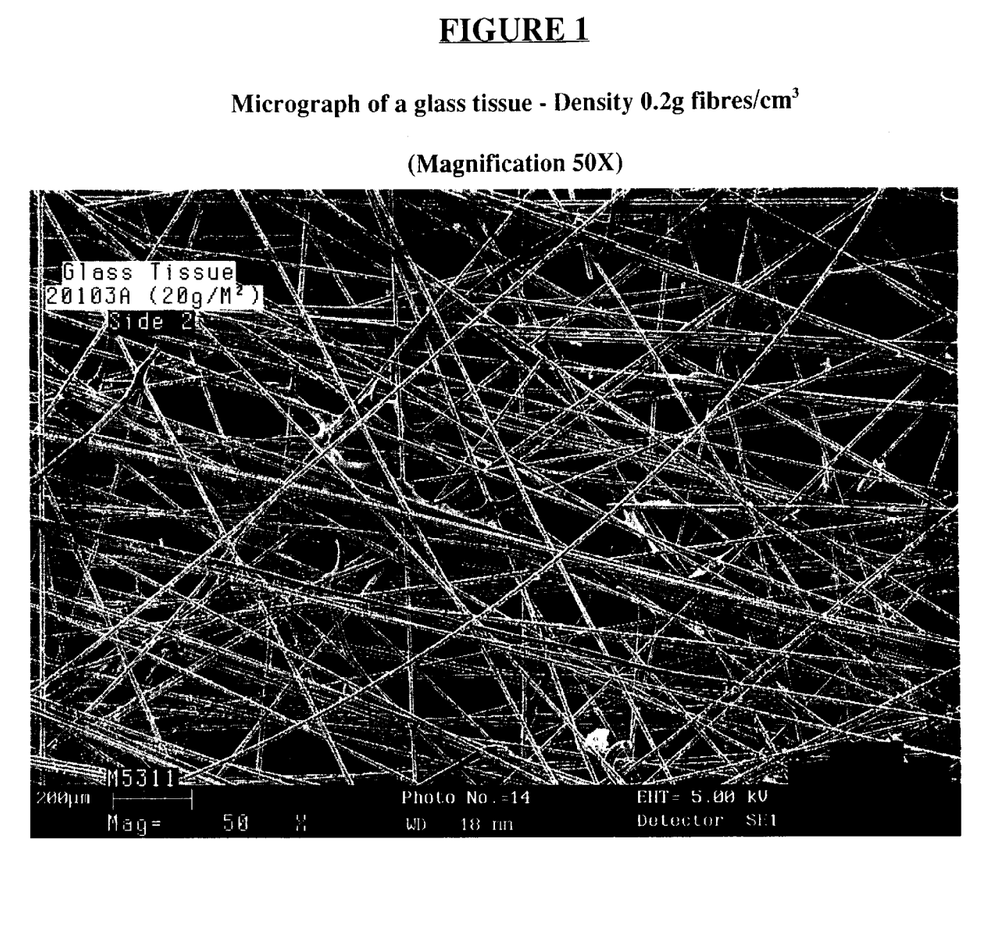
FIG. 1 shows a micrograph of a typical substrate formed from glass fibres containing only one diameter and being randomly oriented individual fibres lying in the x and y directions, obtained using a scanning electron microscope.
Figure 2:
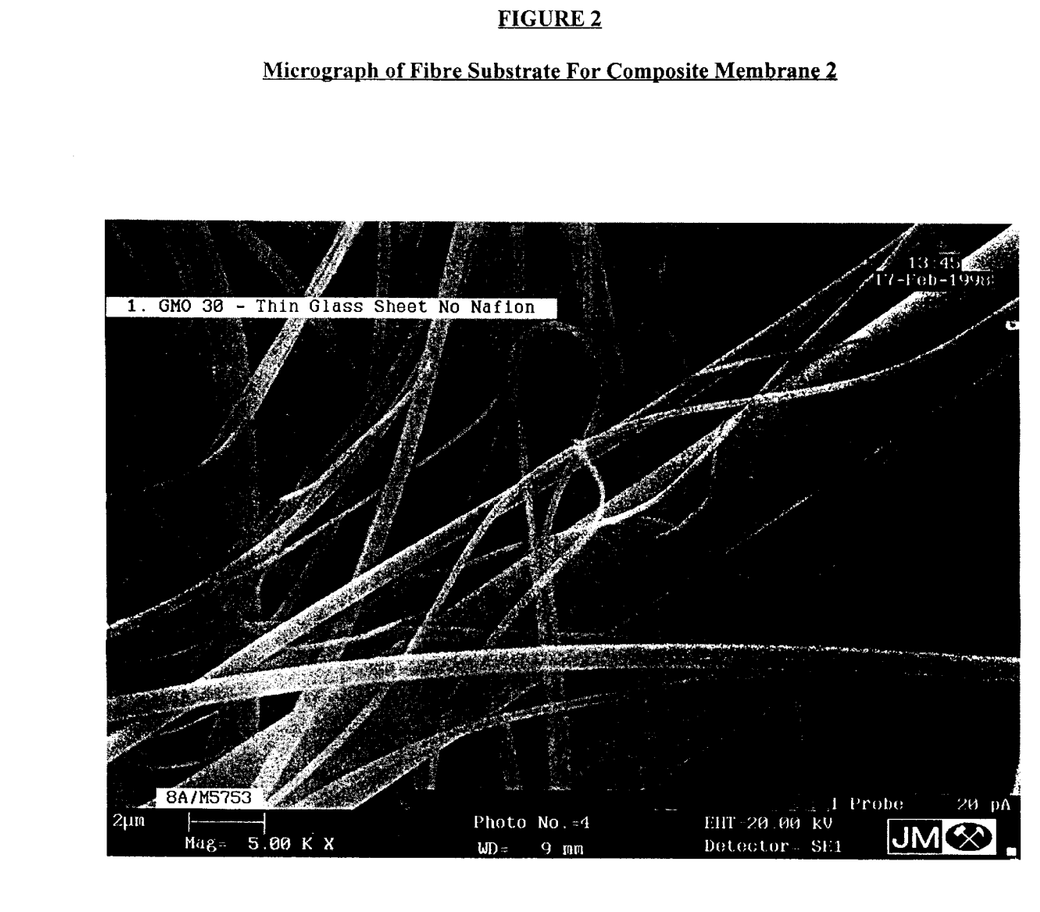
FIG. 2 shows a substrate obtained from Example 2 below with a range of fibre diameters with the finer fibres giving rise to fibres lying in the z direction.

The fibres within the substrate are normally randomly orientated in the x and y direction (in-plane) producing a two dimensional isotropic structure. Additionally, random orientation in the z direction (through-plane) can be introduced with the inclusion of very short fibres, typically lengths of less than or equal to 0.2 mm or very fine fibres, typically of diameters less than or equal to 1 µm. Fibres which are suitable for use in the present invention include glass, polymer, ceramic, quartz, silica, carbon or metal fibres. Fibres of carbon or metal would need to be electrically insulated prior to being formed into the membrane. Suitably, if polymeric fibres are used, the fibres are not polytetrafluoroethylene (PTFE) or polyethylene fibres. Suitably, the fibres are of glass, ceramic, quartz, silica, carbon or metal and preferably of glass, ceramic, or quartz. The fibres are typically of diameters in the range of 0.1 µm to 50 µm, preferably of 0.2 µm to 20 µm and with lengths from 0.05 mm to 300 mm, suitably 0.5 mm to 150 mm. FIG. 1 shows a micrograph of a typical substrate formed from glass fibres containing only one diameter of glass fibre, obtained using a scanning electron microscope, and which clearly show a substrate of randomly orientated individual fibres lying in the x and y directions only. FIG. 2 shows a substrate with a range of fibre diameters with the finer fibres giving rise to fibres lying in the z direction.

For PEM fuel cell applications, the ion conducting polymer is a proton conducting polymer, examples of such polymers being well known to those skilled in the art. More than one proton conducting polymer may be present and/or a non-proton conducting polymer may also be included in the novel membrane of the present invention.

The proton conducting polymers suitable for use in the present invention may include, but are not limited to:

1) Polymers which have structures with a substantially fluorinated carbon chain optionally having attached to it side chains that are substantially fluorinated. These polymers contain sulphonic acid groups or derivatives of sulphonic acid groups, carboxylic acid groups or derivatives of carboxylic acid groups, phosphonic acid groups or derivatives of phosphonic acid groups, phosphoric acid groups or derivatives of phosphoric acid groups and/or mixtures of these groups. Perfluorinated polymers include Nafion®, Flemion® and Aciplex® commercially available from E. I. DuPont de Nemours (U.S. Pat. No. 3,282,875; 4,329,435; 4,330,654; 4,358,545; 4,417,969; 4,610,762; 4,433,082 and 5,094,995), Asahi Glass KK and Asahi Chemical Industry respectively. Other polymers include those covered in U.S. Pat. No. 5,595,676 (Imperial Chemical Industries plc) and U.S. Pat. No. 4,940,525 (Dow Chemical Co.)

2) Perfluorinated or partially fluorinated polymers containing aromatic rings such as those described in WO 95/08581, WO 95/08581 and WO 97/25369 (Ballard Power Systems) which have been functionalised with $SO_3H$, $PO_2H_2$, $PO_3H_2$, $CH_2PO_3H_2$, $COOH$, $OSO_3H$, $OPO_2H_2$, $OPO_3H_2$. Also included are radiation or chemically grafted perfluorinated polymers, in which a perfluorinated carbon chain, for example, PTFE, fluorinated ethylene-propylene (FEP), tetrafluoroethylene-ethylene (ETFE) copolymers, tetrafluoroethylene-perfluoroalkoxy (PFA) copolymers, poly (vinyl fluoride) (PVF) and poly (vinylidene fluoride) (PVDF) is activated by radiation or chemical initiation in the presence of a monomer, such as styrene, which can be functionalised to contain an ion exchange group.

3) Fluorinated polymers such as those disclosed in EP 0 331 321 and EP 0 345 964 (Imperial Chemical Industries plc) containing a polymeric chain with pendant saturated cyclic groups and at least one ion exchange group which is linked to the polymeric chain through the cyclic group.

4) Aromatic polymers such as those disclosed in EP 0 574 791 and U.S. Pat. No. 5,438,082 Hoechst AG) for example sulphonated polyaryletherketone. Also aromatic polymers such as polyether sulphones which can be chemically grafted with a polymer with ion exchange functionality such as those disclosed in WO 94/16002 (Allied Signal Inc.).

5) Nonfluorinated polymers include those disclosed in U.S. Pat. No. 5,468,574 (Dais Corporation) for example hydrocarbons such as styrene-(ethylenebutylene)-styrene, styrene-(ethylene-propylene)-styrene and acrylonitrile-butadiene-styrene co- and terpolymers where the styrene components are functionalised with sulphonate, phosphoric and/or phosphonic groups.

6) Nitrogen containing polymers including those disclosed in U.S. Pat. No. 5,599,639 (Hoechst Celanese Corporation), for example, polybenzimidazole alkyl sulphonic acid and polybenzimidazole alkyl or aryl phosphonate.

7) Any of the above polymers which have the ion exchange group replaced with a sulphonyl chloride ($SO_2Cl$) or sulphonyl fluoride ($SO_2F$) group rendering the polymers melt processable. The sulphonyl fluoride polymers may form part of the precursors to the ion exchange membrane or may be arrived at by subsequent modification of the ion exchange membrane. The sulphonyl halide moieties can be converted to a sulphonic acid using conventional techniques such as, for example, hydrolysis.

Other polymeric materials which are not proton conducting polymers may be used in addition to or in place of a proton conducting polymer. For example, such polymers can be used for applications requiring a bipolar membrane or a completely anion exchange membrane. Anion exchange polymers are generally based on quaternary ammonium groups, rather than the fixed sulphonic acid groups in proton conducting polymers. These include, for example, the tetraalkyl ammonium group ($—N^+R_3$) and the quaternary ammonium centre in Tosflex® membranes ($—N(R_1)(CH_2)_yN^+(R_3)$) supplied by Tosoh. However, it can be envisaged that all of the proton exchange polymers described above could have anion exchange equivalents.

Other non-ion conducting polymeric materials may be used in addition to the one or more ion conducting or proton conducting polymers. Examples of such nonion conducting polymers include PTFE, FEP, PVDF, Viton® and hydrocarbon types such as polyethylene, polypropylene and polymethylmethacralate.

The polymer is suitably applied to the fibres in the form of a solution, the solvents of which may be either organic or aqueous based. Solvents of all of the above polymers may include or may be modified to include, water, methanol and/or other aliphatic alcohols, ethers, acetone, tetrahydrofuran (THF), n-methylpyrrolidone (NMP), dimethyl sulphoxide (DMSO) dimethyl formamide (DMF) dimethyl acetamide (DMAc) or protonic solvents such as sulphuric acid or phosphoric acid and/or mixtures of the above. However, it has been found that an essentially aqueous solution of the polymer as described in EP 0 731 520 is preferred.

SUMMARY OF THE INVENTION

A first advantage of the present invention is that a freestanding, dimensionally stable composite membrane is produced resulting in greater handlability. The membrane of the invention is therefore also more amenable to high volume continuous production processes, as described hereinafter, due to the high dimensional stability of the underlying porous substrate. The high dimensional stability of the membrane enables thinner membranes to be produced which are more amenable to higher volume MEA manufacturing than state of the art thin membranes, which due to the exacerbated dimensional changes with increased levels of water content, are difficult to handle during MEA fabrication.

A further advantage of the composite membrane of the present invention is that a composite membrane having both an intrinsic ionic conductivity and reactant gas cross-over essentially similar to the intrinsic conductivity and reactant gas cross-over shown by a non-reinforced ion conducting membrane of the same polymer, and of comparable thickness, is obtained. This demonstrates an advantage over composite membranes described in the literature where the thickness of the membrane has to be substantially reduced in order to obtain a reasonable conductivity.

A further advantage of the present invention is the greater flexibility to tailor the characteristics of the membrane required for specific applications and/or conditions. It may be beneficial to coat the fibres with one or more different materials prior to forming the porous substrate to obtain additional characteristics required for specific applications. Fibres may be coated with ion exchange polymeric materials with different characteristics such as ion exchange capacity or equivalent weight (EW) and molecular weight in order to modify the water transport properties of the final membrane. The fibres may also be coated with other non ion-conducting polymers to change their surface characteristics, such as PTFE, FEP, PVDF, Viton® and hydrocarbon types such as polyethylene, polypropylene and polymethylmethacralate to make hydrophobic areas within the substrate, or amorphous silica to produce a more hydrophilic surface. Additionally, the fibres may be catalysed with, for example platinum, to combine any reactant hydrogen and oxygen which can diffuse through the membrane (known as gas diffusion cross over), particularly the thinner membranes, and in which the product water so formed acts to enhance the humidification characteristics of the membrane.

It may also be beneficial to incorporate particulate materials within the membrane to increase either the sites available for proton migration and/or to increase the sites available for holding water within the substrate. Materials such as acidic alumina, silica, titanium dioxides, zirconium oxides, zirconium silicates, tungsten oxides, tin oxides and zeolites with a mean particle size of 0.001 $\mu$m to 10 $\mu$m, preferably 0.01 $\mu$m to 5 $\mu$m are examples of suitable particulates which may be used. The particulate material may first be coated, for example, with an ion conducting polymer, a non-conducting hydrophobic or hydrophilic polymer, or a catalyst.

In one embodiment of the present invention more that one type of fibre of differing characteristics are used and mixed together to form a homogenously mixed porous substrate.

In a further embodiment, a laminated membrane comprising more than one polymer containing layer is provided, at least one layer of which is a composite membrane of the invention. Where a laminated membrane is formed which comprises more than one composite membrane layer of the invention, each layer may comprise either the same or different types of fibres and porous substrates and also the same or different types of polymeric material embedded within the porous substrate of each composite membrane layer. Using such a laminated structure, it is possible, for example, to tailor the properties of the laminate membrane opposed to the anode and cathode sides in the MEA of a proton exchange membrane fuel cell, for example, to improve water management in the fuel cell, or to be able to use lower cost proton conducting polymers to form a substantial part of the laminate membrane.

Composite membranes of the present invention are suitable for low cost manufacture. The membranes may be manufactured by one of two general methods.

The membranes may be manufactured by taking a pre-formed porous substrate of randomly orientated individual fibres and thereafter applying the polymeric material. This can be done by any number of coating processes such as printing, rolling, K-bar, doctor blade methods, spraying or thin-film casting.

A preferred method for the manufacture of the composite membrane of the present invention comprises forming a porous substrate of randomly orientated individual fibres by adapting a continuous manufacturing process and thereafter impregnating the substrate with polymeric material. The continuous manufacturing process may be based on paper-making technology, calendering or extrusion. For example, in a process based on paper-making technology the fibres are dispersed in water to form a dilute slurry and thereafter forming a continuous structure by the controlled deposition of said slurry onto a moving mesh bed, dewatering the solids and drying compaction of the fibres, followed by nip roller coating/filling of the substrate with a solution of the polymeric material and further compaction/drying of the membrane under a suitable time/pressure/temperature regime. Alternatively a mixture of the fibres and a solution of a polymeric material may be extruded under controlled temperature/pressure to produce a sheet of the fibre/polymer composite membrane. In one embodiment, the fibres may be pre-coated with one or more materials. In a further embodiment, particulate matter may be added to the fibre containing slurry and/or to the polymeric material. The particulate matter may first be coated with, for example, ion conducting polymer, non-conducting hydrophobic or hydrophilic polymer, or catalyst etc. The membrane is then formed by one of the continuous manufacturing processes described above.

A major advantage of using a continuous manufacturing method such as conventional paper making techniques is that the composite membrane is easily manufactured in a fewer number of steps than prior art composite membranes, thus making it more cost effective and commercially viable. The membrane may also be produced in continuous lengths of many metres, and widths of equal to or greater than one metre, and in a very cost effective manner.

The present invention also relates to a membrane electrode assembly and a method for the manufacture thereof wherein the composite membrane is according to the present invention. A still further aspect of the present invention relates to a fuel cell and a method for the manufacture thereof comprising a composite membrane of the present invention.

A further advantage is that it is possible to combine a membrane of the present invention with one or more electrode layers as described in commonly owned European patent application EP 0 791 974 to form a membrane electrode assembly at the same rate as each individual component could be produced.

The present invention is not limited to the use of the composite membrane in a fuel cell and any electrochemical device which comprises a composite membrane of the invention is within the scope.

The present invention will now be described by way of example only which is not intended to be limiting thereof.

Example 1-(Composite Membrane 1)

A pre-formed non-woven glass fibre substrate of density 0.2 g/cm$^3$ (provided by Technical Fibre Products, Kendal, Cumbria, UK as 10 g/m$^2$ glass tissue Optimat 201), was placed on a sheet of sintered PTFE, and a solution of perfluorosulphonic acid in the aqueous form as described in EP 0 731 520 was applied to the glass fibre tissue. A pre-formed non-woven glass microfibre substrate of density 0.25 g/cm$^3$, (provided as a 15 g/m$^2$ glass mat supplied as "Supercool M" from Technical Fibre Products, Kendal, Cumbria, UK), was applied to the glass tissue/aqueous Nafion® layer and a further layer of the Optimat 201 glass tissue laid on top. The substrate was filled with the aqueous Nafion® to achieve a total solid Nafion® loading of 13.0 mg/cm$^2$, and dried in air at ambient room temperature, to produce a robust and handleable composite membrane with a thickness of 180 μm.

The composite membrane 1 was formed into a MEA using a carbon supported platinum/ruthenium catalyst containing electrode (0.25 mg Pt/cm$^2$) as the anode, and a carbon supported platinum catalyst containing electrode (0.60 mg Pt/cm$^2$) as the cathode. An evaluation of the MEA comprising composite membrane 1 was performed in a complete single fuel cell. The polarisation plot of voltage as a function of current density for the MEA was determined at a cell temperature of 80° C. with $H_2$/air as reactants, each at a pressure of 30 psig (pounds per square inch gauge), and reactant stoichiometries of 1.5 for $H_2$ and 2.0 for air.

The resultant cell performance of 0.685 V at 323 mA/cm$^2$ and 0.544 V at 538 mA/cm$^2$, is comparable to the performance achieved with prior art MEAs fabricated from unreinforced Nafion®117 membrane of a similar thickness to composite membrane 1.

Example 2-(Composite Membrane 2)

A mixture of chopped glass fibres (Type A20 BC, from Schuller International Group Inc., PO Box 5108, Denver, Co 80217), of a fibre length of 12 mm (0.267 g), and glass microfibre (Evanite 608 from Evanite Fibre Corporation, Covallis, Oregon, USA) (0.533 g) were dispersed with mixing in demineralised water (500 cm$^3$). A non-woven substrate of the invention was fabricated from the resulting mixture in a single step process based on the principles of paper-making technology, as a sheet size of 214 cm$^2$ in a standard SCA sheet former (AB Lorentzen & Wettre, Box 4, S-163 93 Stockholm, Sweden). The sheet was air dried at 100° C. A micrograph of the sheet obtained is illustrated in FIG. 2.

The non-woven glass fibre substrate was placed on a sheet of sintered PTFE and a solution of perfluorosulphonic acid in the aqueous form as described in EP 0 731 520 was applied to the glass fibre matrix. The structure was filled with the aqueous solution of Nafion® to achieve a total solid Nafion® loading of 11.2 mg/cm$^2$, and a membrane thickness of 70 μm.

Figure 3:
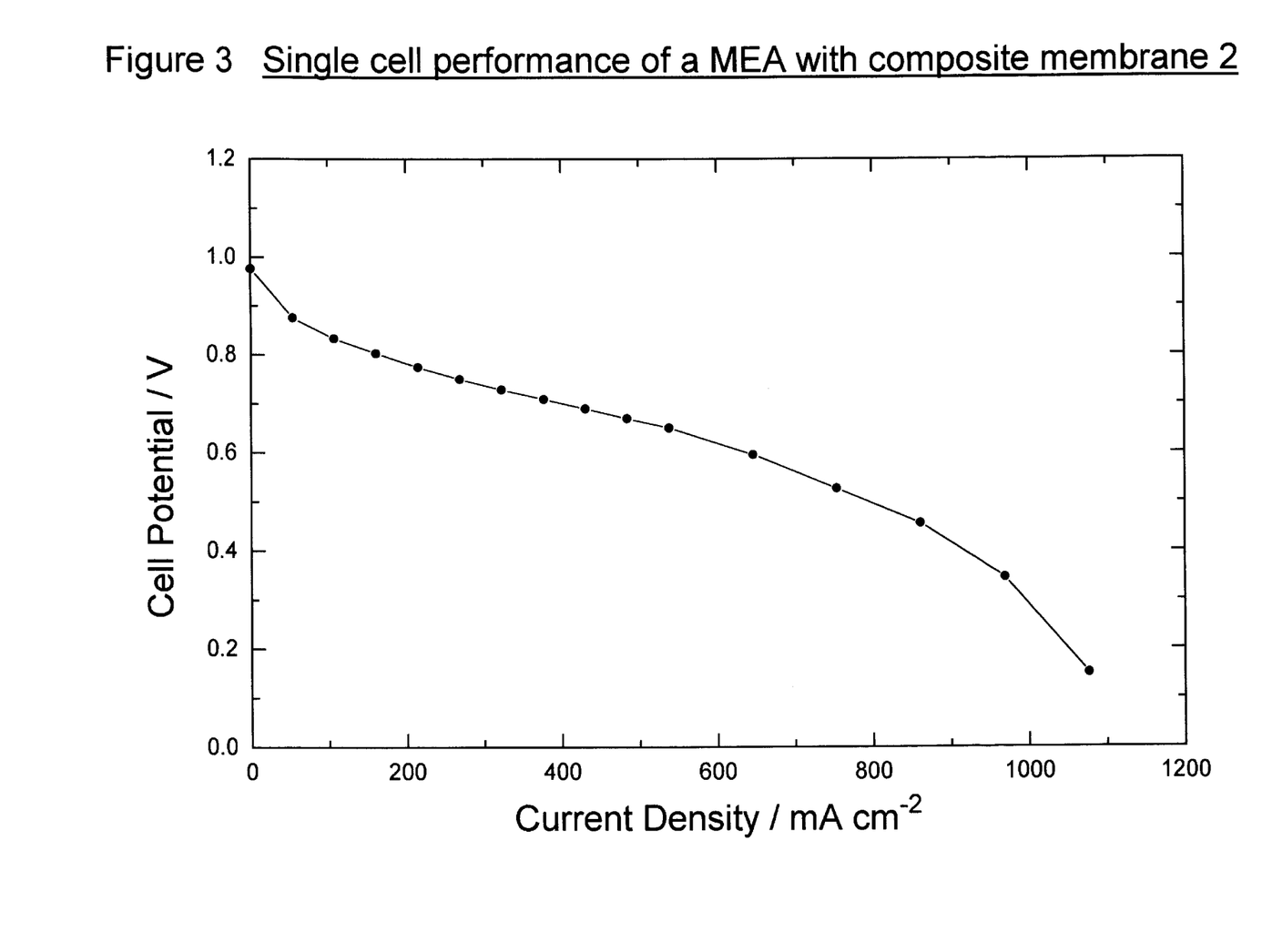
FIG. 3 shows the cell potential vs. current density plot for the membrane as described in Example 2.

Composite membrane 2 was formed into a membrane electrode assembly (MEA) as described in Example 1 and evaluated in the fuel cell at a cell temperature of 80° C. with $H_2$/$O_2$ as reactants, each at a pressure of 30 psig, and reactant stoichiometries of 1.5 for $H_2$ and 10.0 for $O_2$. The cell potential versus current density plot is shown in FIG. 3. This demonstrates that good cell performances were obtained from the MEA comprising the composite membrane of the invention.

Example 3-(Composite Membrane 3)

A mixture of chopped glass fibres (Type A20 BC, from Schuller International Group Inc., PO Box 5108, Denver, Co 80217), of a fibre length of 12 mm (0.7 g) and glass microfibre (Evanite 608 from Evanite Fibre Corporation, Covallis, Oregon, USA) (1.4 g) were dispersed with mixing in demineralised water (500 cm$^3$). A non-woven substrate of the invention was fabricated from the resulting mixture in a single step process based on the principles of paper-making technology, as a sheet size of 330 mm diameter (855.3 cm$^2$) in a custom built sheet former (similar in general operation to the sheetmaker used in Example 2). The sheet was air dried at 105° C.

The substrate was sprayed with a 5% solution of Nafion®, 1100 EW in lower aliphatic alcohols (Solutions Technologies Inc., Mendenhall, PA 19357, USA) to give a dry Nafion® loading of 0.42 mg/cm$^2$.

The pre-coated substrate was placed on a sheet of sintered PTFE and a solution of perfluorosulphonic acid in the aqueous form as described in EP 0 731 520 was applied to the glass fibre substrate. The substrate was filled with the aqueous Nafion® to achieve a total solid Nafion® loading of 18.04 mg/cm$^2$, when fully dry. After applying pressure at a temperature in excess of 150° C., the final membrane thickness was 59 μm.

Figure 4:
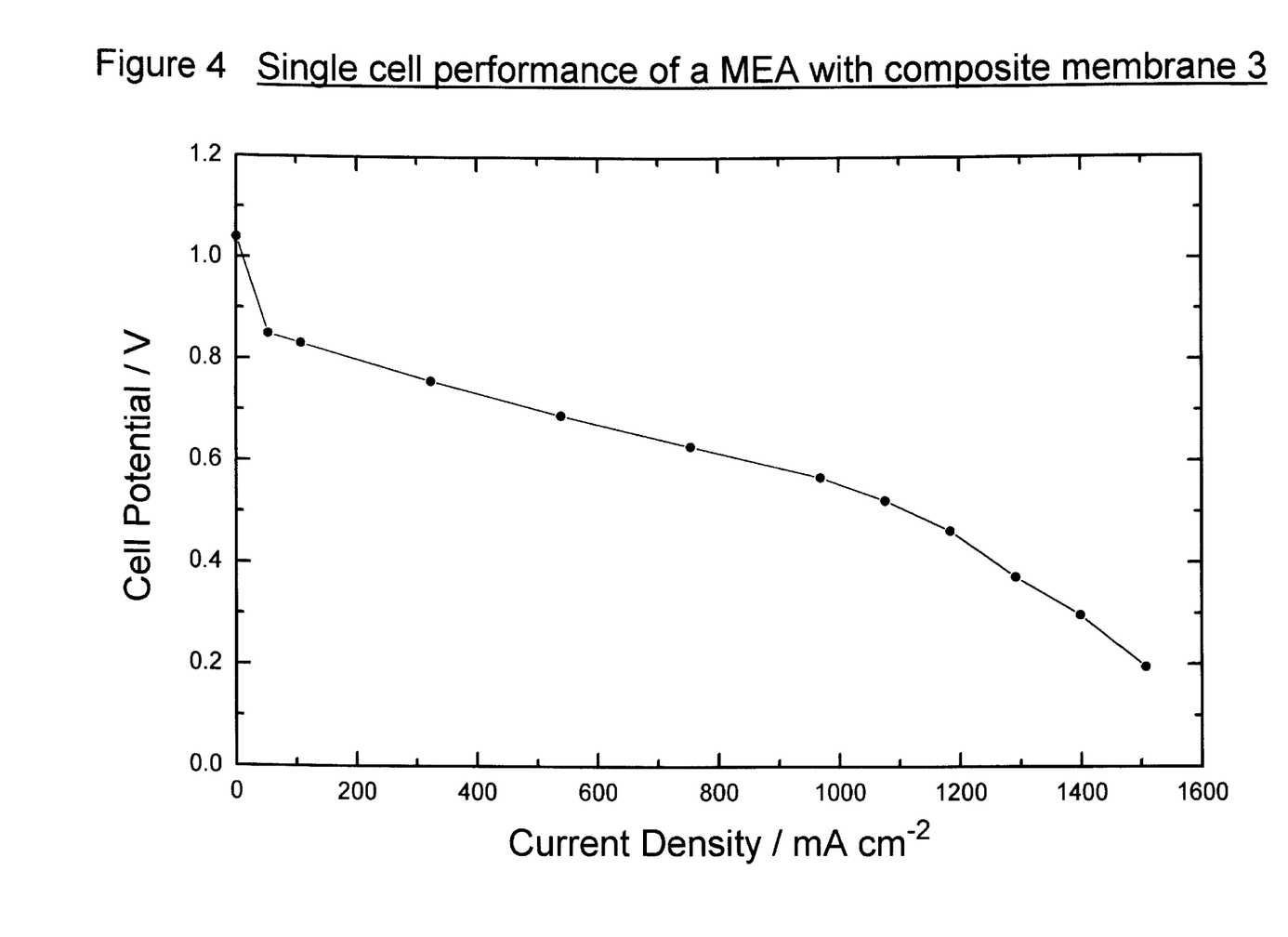
FIG. 4 shows the cell potential vs. current density plot for the membrane as described in Example 3.

Composite membrane 3 was formed into a MEA and evaluated in the fuel cell at a cell temperature of 80° C. with $H_2$/air as reactants, each at a pressure of 30 psig, and reactant stoichiometries of 1.5 for $H_2$ and 2.0 for air. The cell potential versus current density plot is shown in FIG. 4 and the performance is comparable with prior art MEAs employing non reinforced membranes of similar thickness, such as Nafion®112.

Example 4-(Composite Membrane 4)

Figure 5:
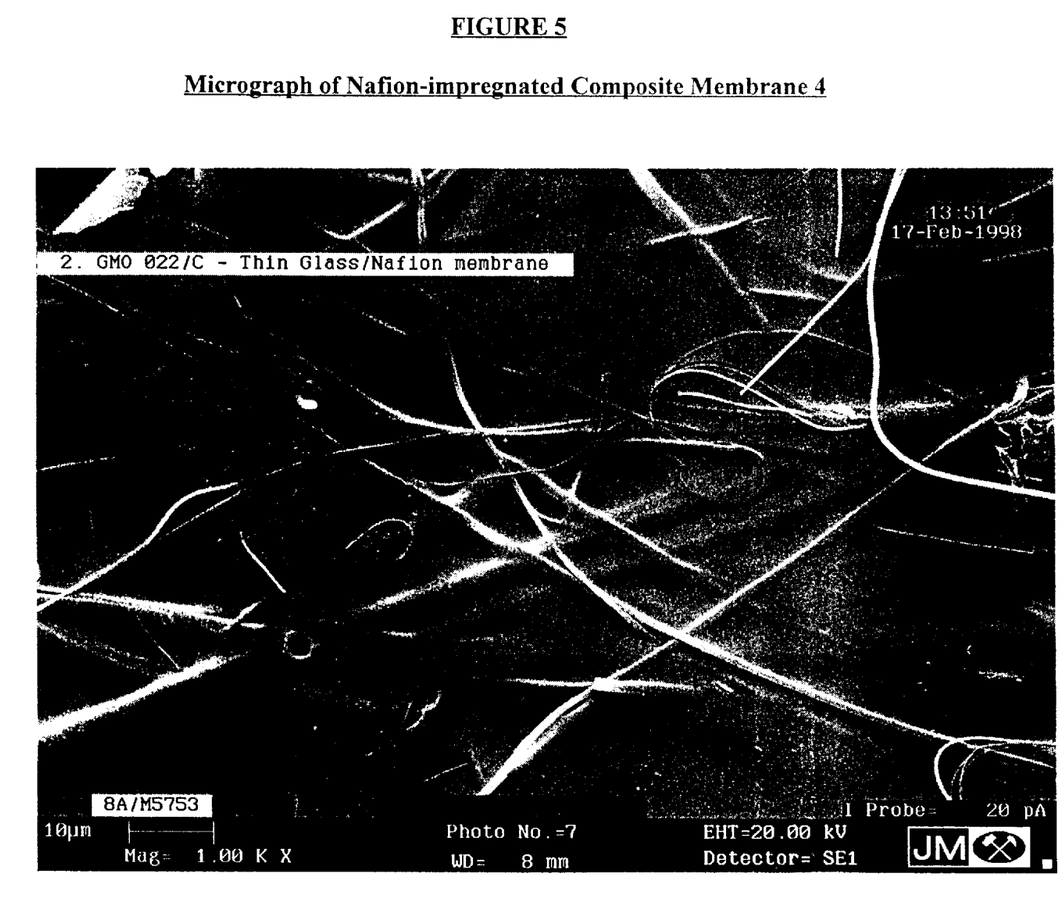
FIG. 5 shows a micrograph of the substrate obtained in Example 4.

A mixture of chopped glass fibres (Type A20 BC, from Schuller International Group Inc., PO Box 5108, Denver, Co 80217), of a fibre length of 12 mm (0.18 g) and glass microfibre (Evanite 608 from Evanite Fibre Corporation, Covallis, Oregon, USA) (0.37 g) were dispersed with mixing in demineralised water (500 cm$^3$). A non-woven substrate of the invention was fabricated from the resulting mixture in a single step process based on the principles of paper-making technology, as a sheet size of 330 mm diameter (855.3 cm$^2$) in a custom built sheet former (similar in general operation to the sheetmaker used in Example 2). The substrate was air dried at 105° C. This gave a substrate thickness of about 25 µm. A micrograph of the substrate obtained is given in FIG. 5.

The non-woven substrate was sprayed with a 5% solution of Nafion®, 1100 EW in lower aliphatic alcohols (Solutions Technologies Inc., Mendenhall, PA 19357, USA) to give a dry Nafion® loading of 0.24 mg/cm$^2$.

The pre-coated, glass fibre substrate was placed on a sheet of sintered PTFE and a solution of perfluorosulphonic acid in the aqueous form as described in EP 0 731 520 was applied to the glass fibre substrate. The substrate was filled with the aqueous Nafion® to achieve a total solid Nafion loading of 4.7 mg/cm, when fully dry. This produced a robust and handleable composite membrane of 25 µm thickness.

Three sheets of the glass fibre composite membrane were prepared as described above and laminated together at a temperature above 150° C. to form a complete membrane of 60 µm thickness.

Figure 6:
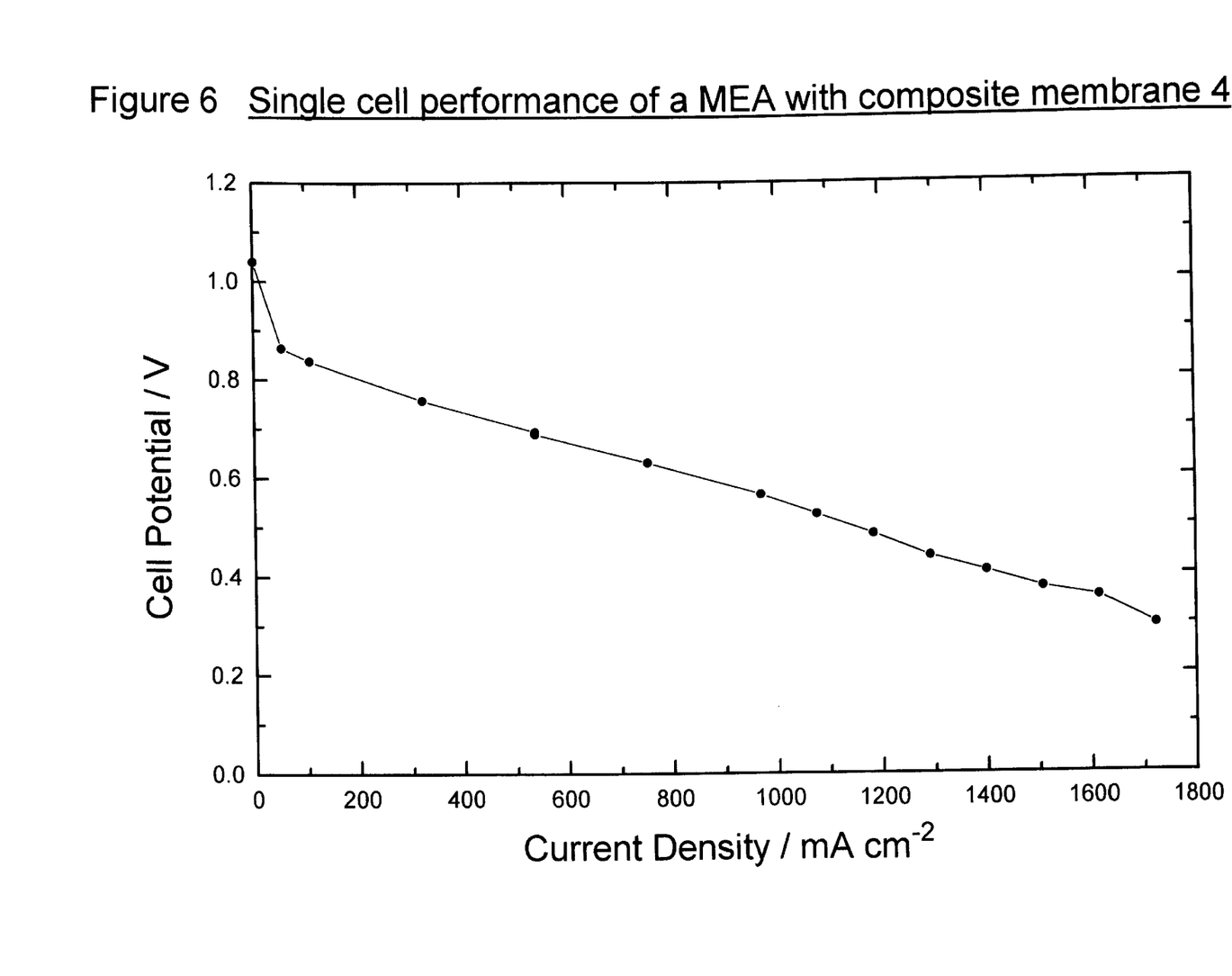
FIG. 6 shows the cell potential vs. current density plot for the membrane as described in Example 4.

The laminated composite membrane 4 was formed into a MEA and evaluated in the fuel cell at a cell temperature of 80° C. with H$_2$/air as reactants, each at a pressure of 30 psig, and reactant stoichiometries of 1.5 for H$_2$ and 2.0 for air. The cell potential versus current density plot is shown in FIG. 6 and the performance is comparable with prior art MEAs employing non reinforced membranes of similar thickness, such as Nafion®112.

Example 5-(Composite Membrane 5)

A quartz microfibre was obtained by placing quartz microfibre filters, (Type QM-A available from Whatman International Ltd, Maidstone, UK) in hot water and dispersing them using a high speed mechanical paddle stirrer. The fibres were then filtered and dried.

The quartz microfibre (0.61 g) was dispersed with mixing in demineralised water (500 cm$^3$). A substrate of the invention was fabricated from the resulting mixture in a single step process based on the principles of paper-making technology, as a sheet size of 330 mm diameter (855.3 cm$^2$) in a custom built sheet former (similar in general operation to the sheetmaker used in Example 2). The substrate was air dried at 105° C. This gave a substrate thickness of about 45 µm.

The non-woven substrate was sprayed with a 5% solution of Nafion®, 1100 EW in lower aliphatic alcohols (Solutions Technologies Inc., Mendenhall, PA 19357, USA) to give a dry Nafion® loading of 0.33 mg/cm$^2$.

The pre-coated, non-woven quartz fibre substrate was placed on a sheet of sintered PTFE and a solution of perfluorosulphonic acid in the aqueous form as described in EP 0 731 520 was applied to the quartz fibre substrate. The substrate was filled with the aqueous Nafion® to achieve a total solid Nafion® loading of 4.8 mg/cm$^2$, when fully dry.

Three sheets of the quartz fibre based composite membrane, were prepared as described above, and laminated together at a temperature in excess of 150° C., to form a complete membrane of 80 µm thickness.

Figure 7:
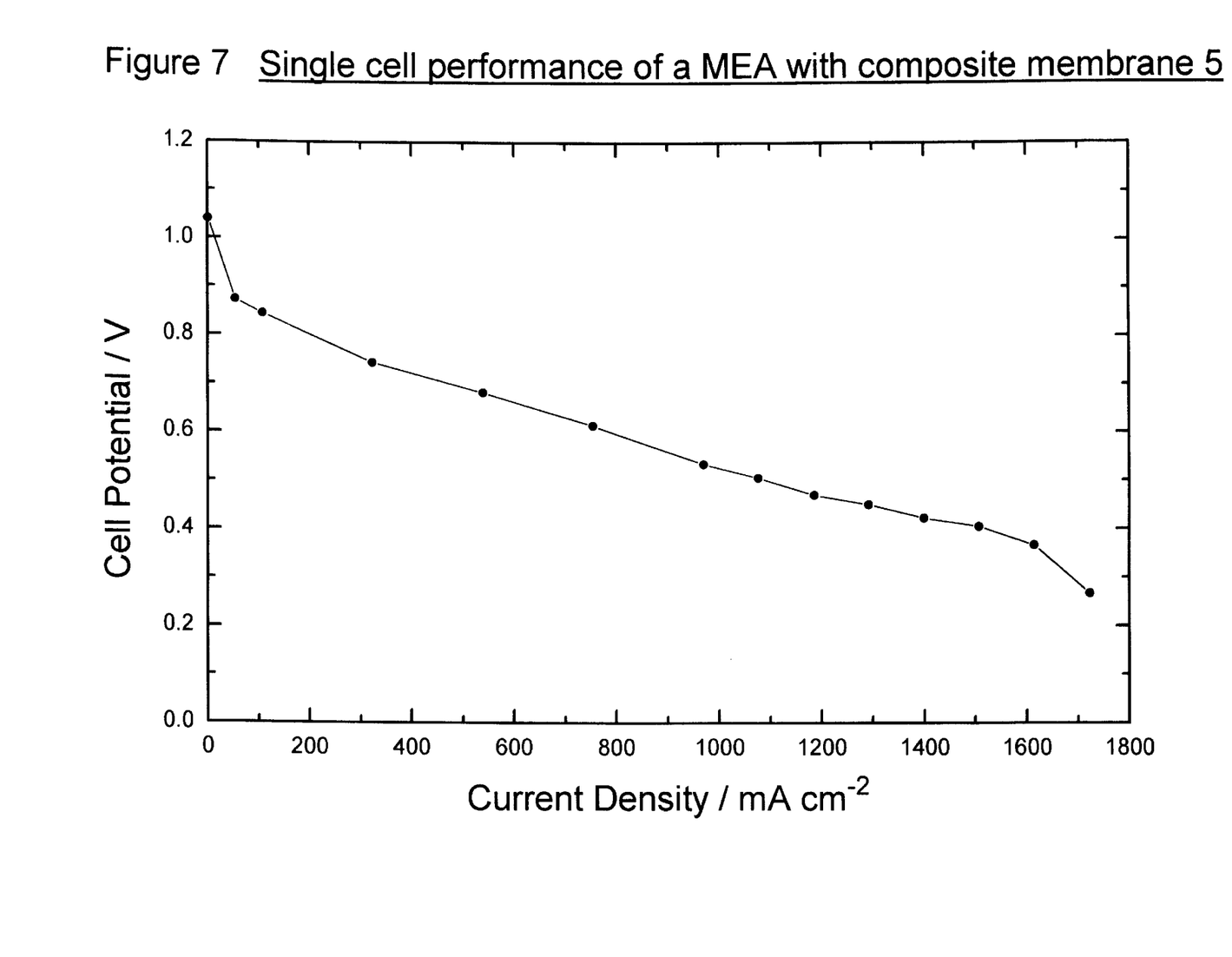
FIG. 7 shows the cell potential vs. current density plot for the membrane as described in Example 5.

The laminated composite membrane 5 was formed into a MEA and evaluated in the fuel cell at a cell temperature of 80° C. with H$_2$/air as reactants, each at a pressure of 30 psig, and reactant stoichiometries of 1.5 for H$_2$ and 2.0 for air. The cell potential versus current density plot is shown in FIG. 7 and the performance is comparable with prior art MEAs employing non reinforced membranes of similar thickness, such as Nafion®1135.

Example 6

Figure 8:
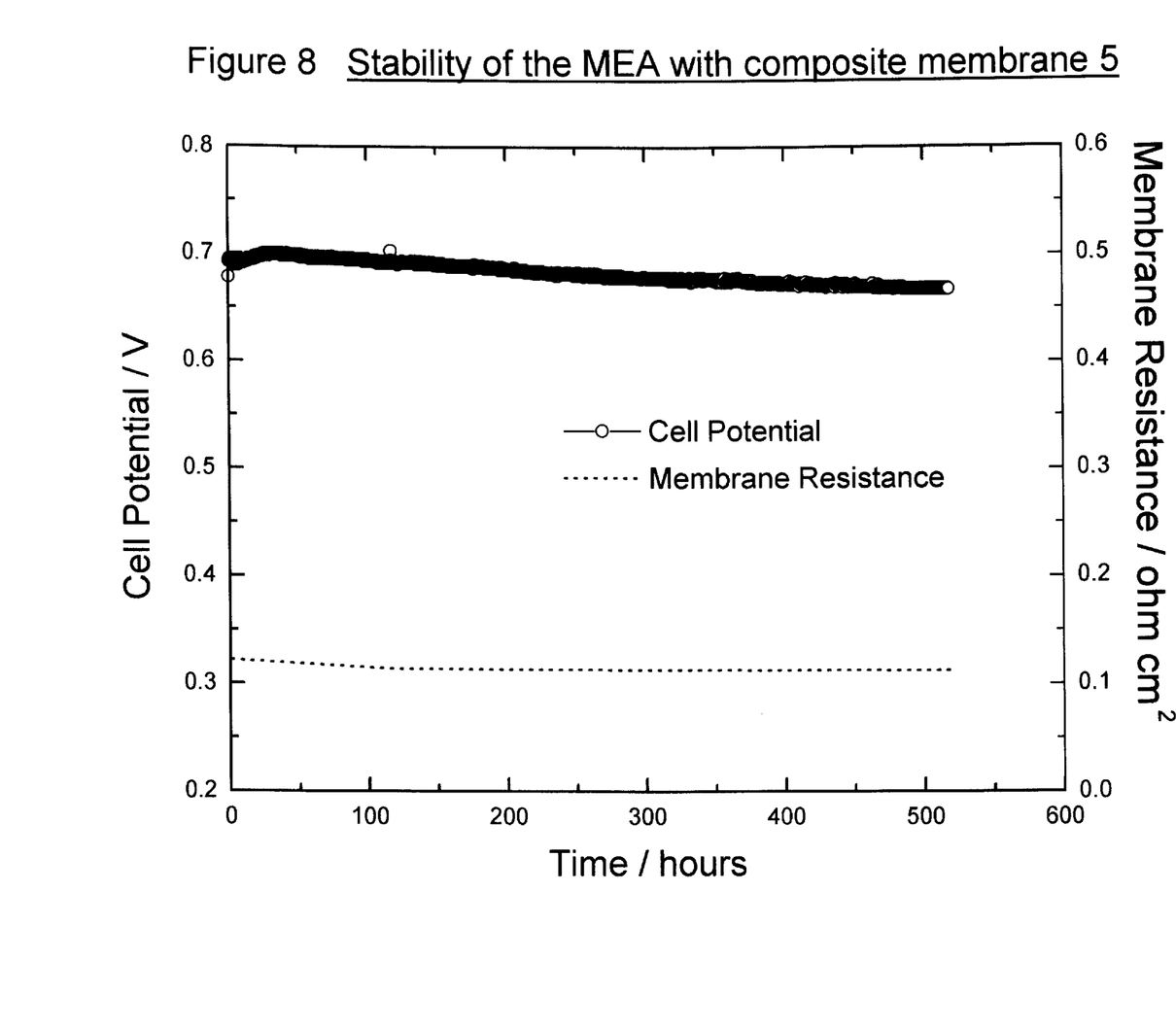
FIG. 8 shows the stability of the cell potential of the MEA after after 500 hours of operation and shows the measurement of the membrane resistance with time.

The single cell comprising the MEA formed from composite membrane 5, as described in Example 5, was evaluated for performance stability, by maintaining the current density at 538 mA/cm$^2$ and following, with time, the cell potential and the in-situ membrane resistance, using the current-interrupt technique as described by, for example, F.N. Buchi et al, J. Electrochem. Soc., 142, 1895, (1995). FIG. 8 shows that after 500 hours of continuous fuel cell operation the MEA demonstrates a stable cell potential. Further, FIG. 8 also shows measurement of the membrane resistance with time and this demonstrates that the membrane resistance was essentially unchanged from 0.113 Ωcm$^2$ at the beginning of the test to 0.112Ωcm$^2$ after 500 hours operation. The composite membrane of the invention shows excellent stability in the PEMFC environment.

Example 7

Figure 9:
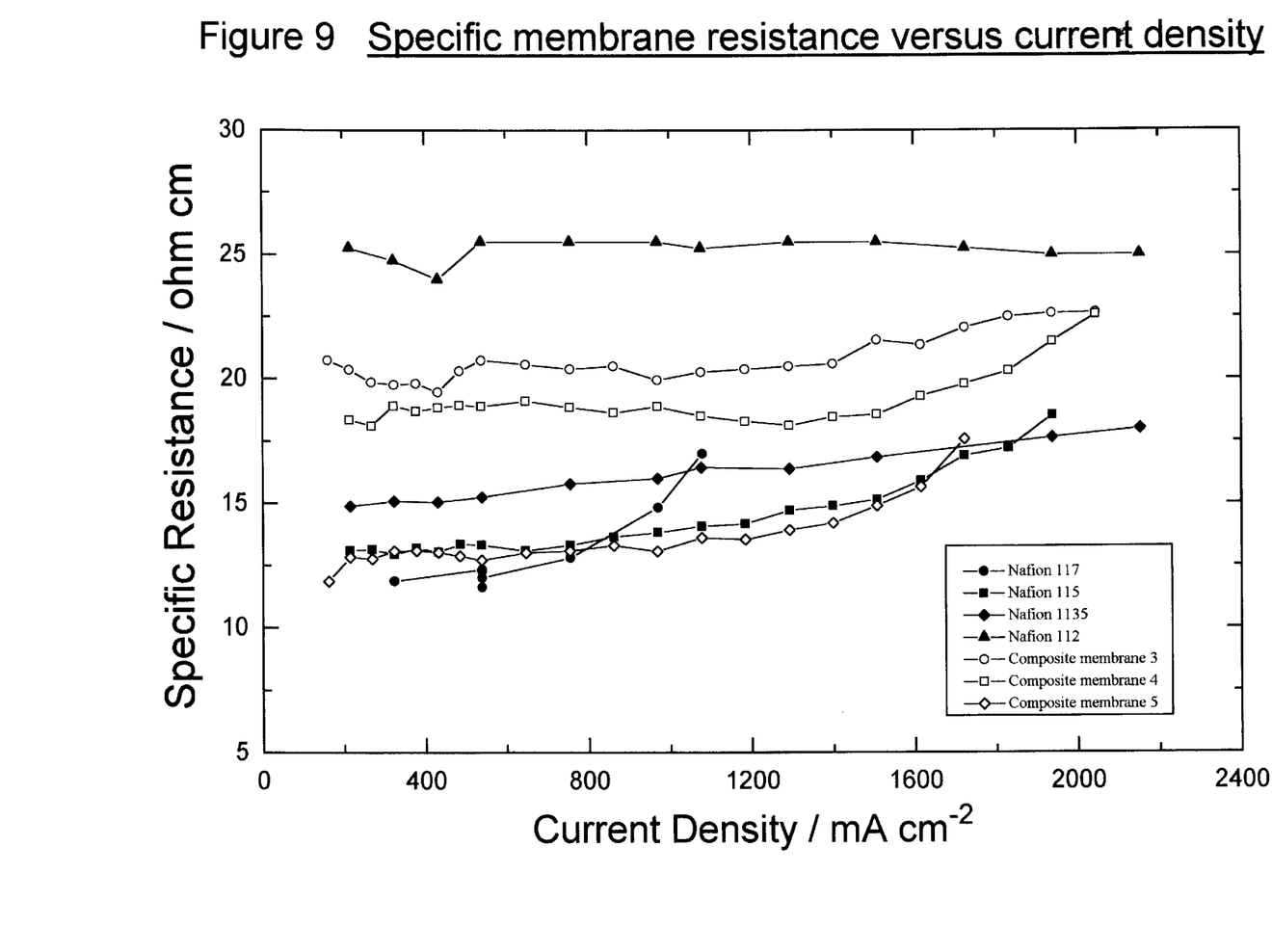
FIG. 9 shows the plot of specific resistance vs. current density produced by the MEAs.

The specific resistance of a membrane is given by the ratio of the area membrane resistance (Ωcm$^2$) to the membrane thickness (cm) and is used to compare the intrinsic resistance of membranes of different thickness. The specific resistance of the composite membrane of this invention and of the state of the art pure unreinforced Nafion® membranes was measured in MEAs prepared as detailed in Example 1 by using the currentinterrupt technique to measure the in-situ membrane resistance in the fuel cell and by dividing by the membrane thickness in the MEAs as measured from electron probe microanalysis (EPMA) micrographs. FIG. 9 shows the plot of specific resistance versus the current density produced by the MEA. This shows that the composite membranes of this invention have a comparable specific resistance to the pure Nafion® family of membranes.

Example 8

Figure 10:
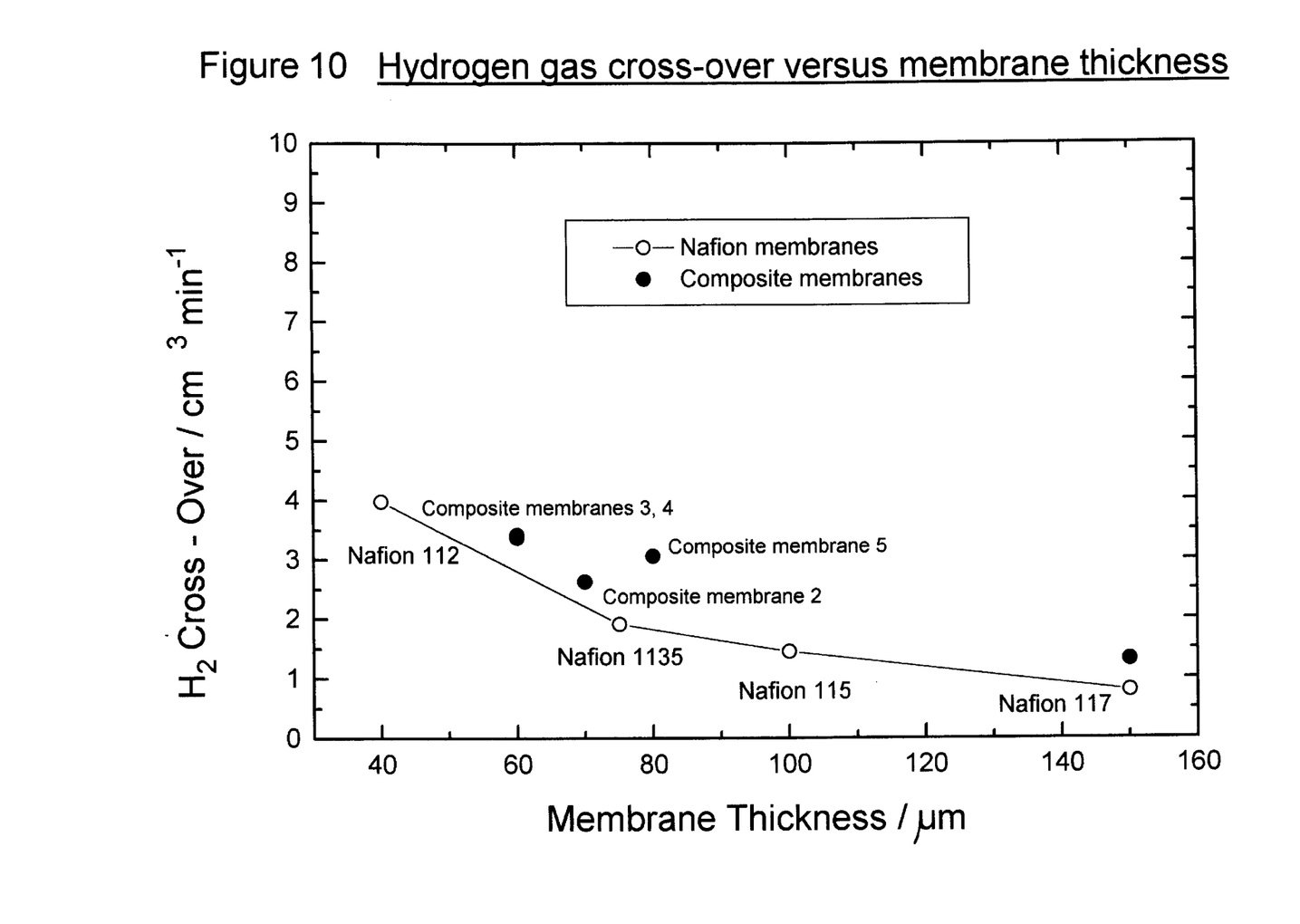
FIG. 10 shows the resultant plot of $H_2$ gas cross-over vs. membrane thickness for the MEAs.

It is also important that membranes for the PEMFC do not show excessive rates of gas cross-over of H$_2$ from anode to cathode and of O$_2$ from cathode to anode. Due to the higher rate of H$_2$ diffusion it is generally more problematical than O$_2$ diffusion through the membrane. The rate of H$_2$ gas cross-over through the membrane in the MEAs described in Example 7 was measured in the fuel cell while it was not generating electrical energy ie under open circuit conditions. Rather than air or O$_2$, inert N$_2$ gas (deoxygenated) was passed into the cathode of the fuel cell and H$_2$ into the anode of the fuel cell. After allowing sufficient time to remove all traces of O$_2$ from the cathode the current due to the oxidation of the hydrogen passing through the membrane to the cathode, which was rate-determining, was measured using a potentiostat/galvanostat and converted into the rate of H$_2$ gas cross-over. FIG. 10 shows the resultant plot of H$_2$ gas cross-over versus membrane thickness for the MEAs. This shows that the composite membranes of this invention show comparable rates of gas cross-over to the pure Nafion® membranes. The rate of gas cross-over through the composite membrane of this invention amounts to less than 0.01% of the H$_2$ being fed to the anode. The composite membrane of this invention is gas tight.

We claim:

1. A composite membrane consisting essentially of a porous substrate of randomly oriented individual fibres and at least one ion conducting polymer, characterised in that the ion conducting polymer is embedded within the porous substrate.

2. A composite membrane according to claim 1 wherein the fibres are selected from one or more of glass, polymer, ceramic, quartz, silica, carbon or metal.

3. A composite membrane according to claim 2 wherein the fibres are selected from one or more of glass, ceramic or quartz.

4. A composite membrane according to claim 1 wherein the fibres are typically of diameters in the range of 0.1 $\mu$m to 50 $\mu$m.

5. A composite membrane according to claim 4 wherein the fibres are typically of lengths from 0.05 mm to 300 mm.

6. A composite membrane according to claim 1 wherein the ion conducting polymer is applied in the form of a solution, the solvents of which may be either organic or aqueous based.

7. A composite membrane according to claim 1 wherein the ion conducting polymer is a proton conducting polymer.

8. A composite membrane according to claim 7 wherein the proton conducting polymer is applied in the form of an aqueous solution.

9. A composite membrane according to claim 1 wherein the fibres are coated with one or more different materials prior to forming the porous substrate of randomly orientated individual fibres.

10. A composite membrane according to claim 9 wherein the fibres are coated with an ion conducting polymer.

11. A composite membrane according to claim 9 wherein the fibres are coated with non ion-conducting polymer.

12. A composite membrane according to claim 9 wherein the fibres are coated with catalyst.

13. A composite membrane according to claim 1 in which particulate material is incorporated therein.

14. A composite membrane according to claim 13 wherein the particulate material has a mean particle size of 0.001 $\mu$m to 10 $\mu$m.

15. A composite membrane according to claim 13 or 14 in which the particulate material is coated with one or more of ion conducting polymer, non ion-conducting polymer or catalyst prior to incorporation into the membrane wherein said coating on said particulate material is adapted to increase the sites available for proton migration or increase sites available for holding water within the substrate.

16. A composite membrane according to claim 1 wherein more than one type of fibre of differing characteristics are combined to form the porous substrate.

17. A laminated composite membrane comprising two or more polymer containing layers, wherein at least one of the layers is a composite membrane according to claim 1.

18. A method for the manufacture of a composite membrane according to claim 1 comprising taking a pre-formed substrate of randomly orientated individual fibres and thereafter applying the polymeric material.

19. A method for the manufacture of a composite membrane according to claim 1 which comprises forming a porous substrate of randomly orientated individual fibres by adapting a continuous manufacturing process and thereafter impregnating the porous substrate with polymeric material.

20. A membrane electrode assembly comprising a composite membrane according to claim 1, said membrane being adjacent at least one electrode.

21. A fuel cell comprising a composite membrane according to claim 1, said membrane being adjacent at least one electrode.

22. A composite membrane consisting essentially of a plurality of fibres randomly combined to form a porous substrate and at least one polymeric material, characterised in that the polymeric material is embedded within the porous substrate.

23. A composite membrane according to claim 1 or 22 wherein at least 50% of the individual pore sizes within the porous substrate are greater than 1 $\mu$m in at least one direction.

24. A composite membrane according to claim 23 wherein the thickness of the membrane is less than 200 $\mu$m.

25. A composite membrane according to claim 24 wherein the thickness of the membrane is less than 100 $\mu$m.

26. A composite membrane according to claims 1 or 22 wherein at least 75% of the individual pore sizes within the porous substrate are greater than 1 $\mu$m.

27. A composite membrane according to claim 22 wherein the thickness of the membrane is less than 200 $\mu$m.

28. A composite membrane according to claim 27 wherein the thickness of the membrane is less than 100 $\mu$m.

* * * * *